(12) United States Patent
Maeda et al.

(10) Patent No.: US 6,618,455 B1
(45) Date of Patent: Sep. 9, 2003

(54) CLOCK MANAGEMENT METHOD AND TRANSMISSION APPARATUS FOR SYNCHRONOUS NETWORK SYSTEM

(75) Inventors: Haruo Maeda, Kanazawa (JP); Masaru Tanaka, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/375,297

(22) Filed: Aug. 16, 1999

(30) Foreign Application Priority Data

Aug. 26, 1998 (JP) .............................. 10-239781

(51) Int. Cl.⁷ .............................. H04L 7/00; H04J 3/06; G06F 15/16; G06F 1/12
(52) U.S. Cl. ...................... 375/354; 375/355; 375/356; 375/357; 370/516; 370/535; 709/248; 709/400; 713/400; 713/601
(58) Field of Search .......................... 375/357, 240.03, 375/224, 354, 355, 356; 370/516, 535; 709/248, 400; 713/400, 601

(56) References Cited

U.S. PATENT DOCUMENTS

| | | | | |
|---|---|---|---|---|
| 5,153,824 A | * | 10/1992 | Lalanne et al. | 364/184 |
| 5,682,408 A | | 10/1997 | Tanonaka | |
| 5,689,536 A | | 11/1997 | Iyota et al. | |
| 6,144,675 A | * | 11/2000 | Wakabayashi et al. | 370/516 |
| 6,173,023 B1 | * | 1/2001 | Tanonaka et al. | 375/357 |
| 6,188,701 B1 | * | 2/2001 | Tsukamoto et al. | 370/535 |
| 6,343,096 B1 | * | 1/2002 | Davidsson et al. | 375/224 |
| 6,389,066 B1 | * | 5/2002 | Ejzak | 375/224 |

FOREIGN PATENT DOCUMENTS

WO      WO 98/04064      1/1998

* cited by examiner

*Primary Examiner*—Stephen Chin
*Assistant Examiner*—Sam K. Ahn
(74) *Attorney, Agent, or Firm*—Katten Muchin Zavis Rosenman

(57) ABSTRACT

In a clock management apparatus for a synchronous network system, when the quality of a clock signal is deteriorated, the clock signal is switched to another clock signal automatically to continue synchronous communication. Clock signals are received and extracted by transmission/receiving units of the synchronous network system. A plurality of clock signals including the extracted clock signals and a clock signal from an external clock are selectively switched by a clock switching unit, and a master clock signal is selected and output based on quality information transferred with each clock signal. The master clock signal is applied to a clock generator generate a clock signal. A quality control table is used to convert quality information into associated quality levels. A quality determination processing unit issues an alarm when the quality level of the master clock signal is deteriorated beyond a threshold provided by a synchronization management table.

6 Claims, 16 Drawing Sheets

Fig.2

| A1 | A1 | A1 | A2 | A2 | A2 | C1 | | |
|----|----|----|----|----|----|----|----|----|
| B1 | | | E1 | | | F1 | | |
| D1 | | | D2 | | | D3 | | |
| | | | | | | | | |
| B2 | B2 | B2 | K1 | | | K2 | | |
| D4 | | | D5 | | | D6 | | |
| D7 | | | D8 | | | D9 | | |
| D10 | | | D11 | | | D12 | | |
| S1 | S1 | S1 | S2 | S2 | S2 | E2 | | |

Fig.3

| SMF | FRAME No. | BITS | | | | | | | |
|---|---|---|---|---|---|---|---|---|---|
| | | 1 | 2 | 3 | 4 | 5 | 6 | 7 | 8 |
| I | 0 | C1 | 0 | 0 | 1 | 1 | 0 | 1 | 1 |
| | 1 | 0 | 1 | A | Sa4 | Sa5 | Sa6 | Sa7 | Sa8 |
| | 2 | C2 | 0 | 0 | 1 | 1 | 0 | 1 | 1 |
| | 3 | 0 | 1 | A | Sa4 | Sa5 | Sa6 | Sa7 | Sa8 |
| | 4 | C3 | 0 | 0 | 1 | 1 | 0 | 1 | 1 |
| | 5 | 1 | 1 | A | Sa4 | Sa5 | Sa6 | Sa7 | Sa8 |
| | 6 | C4 | 0 | 0 | 1 | 1 | 0 | 1 | 1 |
| | 7 | 0 | 1 | A | Sa4 | Sa5 | Sa6 | Sa7 | Sa8 |
| II | 8 | C1 | 0 | 0 | 1 | 1 | 0 | 1 | 1 |
| | 9 | 1 | 1 | A | Sa4 | Sa5 | Sa6 | Sa7 | Sa8 |
| | 10 | C2 | 0 | 0 | 1 | 1 | 0 | 1 | 1 |
| | 11 | 1 | 1 | A | Sa4 | Sa5 | Sa6 | Sa7 | Sa8 |
| | 12 | C3 | 0 | 0 | 1 | 1 | 0 | 1 | 1 |
| | 13 | E | 1 | A | Sa4 | Sa5 | Sa6 | Sa7 | Sa8 |
| | 14 | C4 | 0 | 0 | 1 | 1 | 0 | 1 | 1 |
| | 15 | E | 1 | A | Sa4 | Sa5 | Sa6 | Sa7 | Sa8 |

Fig. 5

| |
|---|
| SYNCMSG = Y/N |
| RVRTV = Y/N |
| STIMR = Y/N |
| GP1CODE = xxxx/N |
| GP2CODE = xxxx/N |
| HZCODE-P = xxxx |
| HZCODE-S = xxxx |
| BITCODE-P = xxxx/N |
| BITCODE-S = xxxx/N |
| QLTHMCLK = xxxx |
| QLTHOUT = xxxx |
| ERRFREE = Y/N |

Fig. 6

| SSM | QL |
|---|---|
| SSMB0000 | = 2 |
| SSMB0001 | = 6 |
| SSMB0010 | = 2 |
| SSMB0011 | = 6 |
| SSMB0100 | = 3 |
| SSMB0101 | = 6 |
| SSMB0110 | = 6 |
| SSMB0111 | = 6 |
| SSMB1000 | = 4 |
| SSMB1001 | = 6 |
| SSMB1010 | = 6 |
| SSMB1011 | = 5 |
| SSMB1100 | = 6 |
| SSMB1101 | = 6 |
| SSMB1110 | = 6 |
| SSMB1111 | = 6 |

Fig.9

| UNIT CODE / QUALITY STATE | QUALITY GOOD | QUALITY DETERIORATED |
|---|---|---|
| 71 | SEND OUT 2 MHz | STOP OUTPUT |
| 72 | SEND OUT 2 MBIT | SEND OUT ASYNCHRONOUS AIS |
| 73 | SEND OUT 2 MBITSSMB | SEND OUT ASYNCHRONOUS/ SYNCHRONOUS AIS |

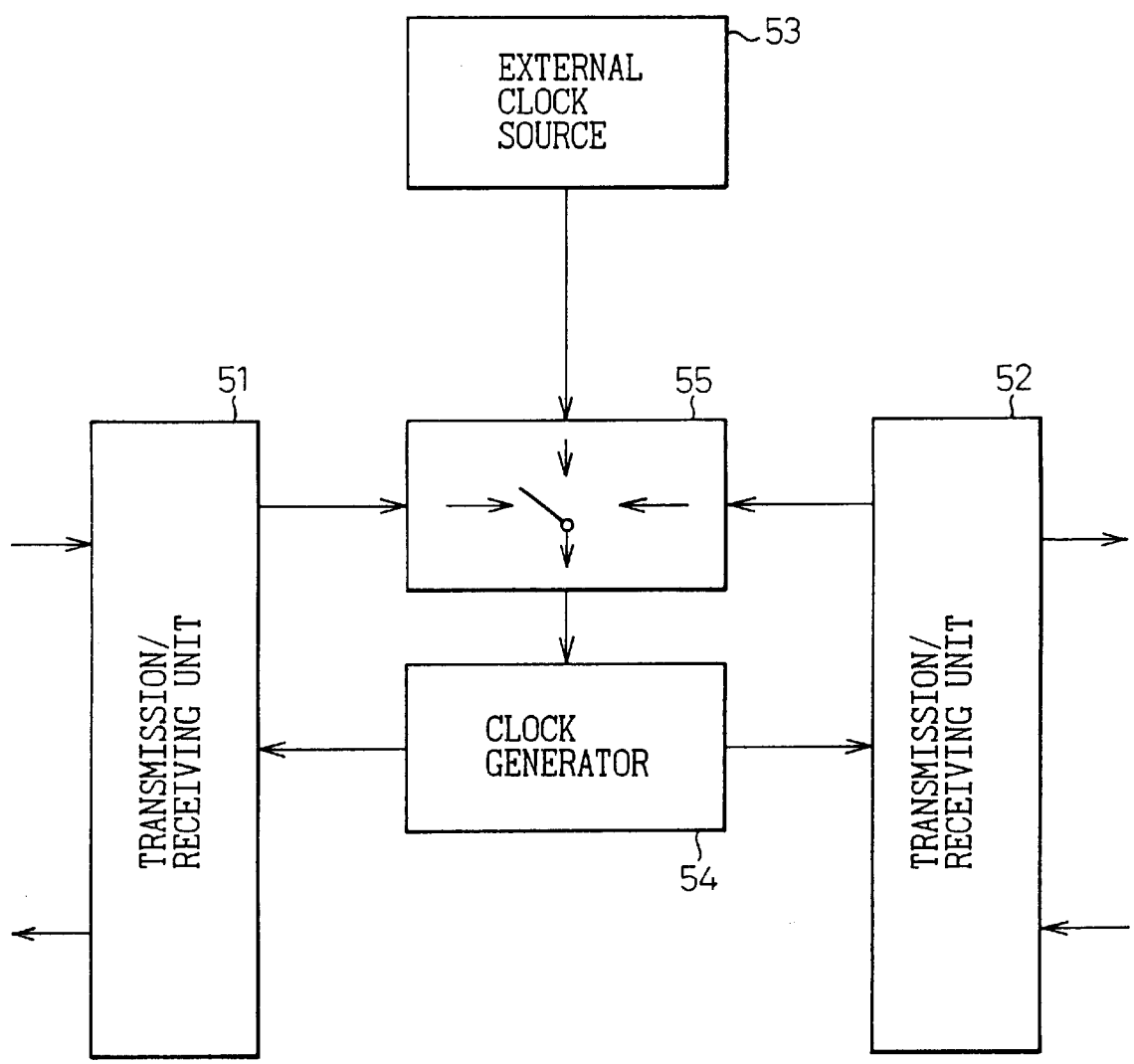

CLOCK MANAGEMENT METHOD AND TRANSMISSION APPARATUS FOR SYNCHRONOUS NETWORK SYSTEM

BACKGROUND OF THE INVENTION

1. Field of the Invention

The present invention relates to a synchronous network system and a clock management method wherein one of a plurality of clock signals can be selected to synchronize the communication within a network.

In a synchronous network system for the synchronous digital hierarchy (SDH) network, one of a plurality of clock signals is selected as a master clock signal, and a clock signal is generated in synchronization with the selected clock signal thereby to conduct the communication. In the event that this selected clock signal is deteriorated in quality, normal communication becomes impossible. The communication can be continued, however, by switching to a clock signal having a better quality. It is desired to further improve the reliability of the synchronous network system by switching among a plurality of clock signals in this way.

2. Description of the Related Art

A conventional network equipment in a synchronous network system often is not controlled in accordance with the quality information of the clock signal. In such a case, a clock switching unit selectively outputs a clock signal which has been preset by a maintenance operator. In the case where the clock signal turns off, therefore, a clock signal can continue to be generated in a hold over state, in which the clock signal is the one of the immediately preceding phases, or by an internal oscillator. Nevertheless, a problem arises in that the accuracy of the clock signal is difficult to maintain for the synchronous network because the quality of the clock signal is not judged in the hold over state or in the internal oscillator. To avoid this, another clock signal, other than the clock signal of the hold over state or of the internal oscillator, must be selected. To select the another clock signal, the operator is required to control a clock switching unit. Therefore, the inconvenience cannot be obviated rapidly.

In the event that an off-state of the clock signal is detected, an alarm indication signal (AIS) is applied to a corresponding transmission apparatus. Since the synchronization cannot be guaranteed for the synchronous network when the AIS is generated, however, the corresponding network equipment often cannot accurately receive and detect the AIS. The result is a transmission and receiving operation using a clock signal of low accuracy. This has led to a problem of synchronization failure for the synchronous network as a whole.

SUMMARY OF THE INVENTION

An object of the present invention is to provide a clock management method and a transmission apparatus such as a network equipment for a synchronous network system which solves the above-mentioned problems of the. synchronous network.

According to one aspect of the present invention, there is provided a clock management method for a synchronous network system, comprising the steps of selecting a master clock signal from a plurality of clock signals and carrying out the communication between transmission apparatuses using a clock signal generated based on the master clock signal or a clock signal generated in the local apparatus alone, selectively switching and outputting the master clock signal by a clock switching unit based on the quality information transferred with a plurality of the clock signals, carrying out the communication by generating a clock signal from a clock generator based on the master clock signal, setting a variable threshold for judging the deterioration of the quality level based on the quality information transferred with the clock signal, and issuing an alarm in the case where the quality level of the clock signal selectively switched and output by the clock switching unit is deteriorated beyond the threshold.

Also, in the case where the quality level of all of a plurality of the clock signals are deteriorated beyond the threshold, the communication can be continued using the clock signal generated by the clock generator under the hold over state. Alternatively, under this state, the communication can be switched in a manner to use a clock signal generated from an independent clock generator. Further, when the quality of the clock signal output from an external output port is deteriorated, an alarm indication signal (AIS) can be sent out in synchronism with the clock signal of the synchronous network system. Also, a plurality of types of units are mounted, and the unit type is identified so that a clock signal corresponding to a particular unit type can be sent out. For example, it is possible to send out an analog clock signal or a digital clock signal selected as the type of the clock signal in accordance with the unit type.

Also, in the case where all of the quality levels indicated by the quality information transferred with a plurality of clock signals are deteriorated beyond a threshold, a deteriorated clock signal, an alarm indication signal (AIS) or other control signal can be selectively output from the external output port. Also, the alarm indication signal (AIS) from the external output port can be sent out in synchronism with the clock signal on the network. Further, in the case where the transmission apparatus has the function of sending out by changing the quality information of the clock signal, if the quality information of the clock signal received and extracted from the line on one side coincides with the quality information of the clock signal received and extracted from the other side or if the quality information of the clock signal received and extracted from the line on the other side coincides with the quality information of the clock signal sent out to the other line then, a closed loop state is determined and a "do not use" message DUS is sent out with the signal. Also, the valid/invalid state of the switching protection can be set, and in valid state, the process for switching to the original clock signal can be included only when a new alarm is not generated within a switching protection time at the time of restoration after an alarm.

According to a second aspect of the invention, there is provided a transmission apparatus of a synchronous network system, wherein a master clock signal is selected from a plurality of clock signals, and the communication is carried out by a clock signal generated based on the master clock or by a clock signal generated only in the own transmission apparatus, comprising a clock switching unit for switching a plurality of clock signals and applying a master clock signal to a clock generator, a synchronization management table for setting a threshold of the quality level based on the quality information transferred with the clock signal, and a quality determination processing unit for monitoring the quality level of the clock signal selectively switched and output by the clock switching unit and controlling the clock switching unit in such a manner as to switch to another clock signal when the prevailing clock signal is deteriorated beyond the quality level threshold set by the synchronization management table.

The system can also comprise the quality control table for converting the quality information of the clock signal received and extracted into a quality level and comparing it with a quality level threshold in the quality determination processing unit. The synchronization management table can have an area for setting the validity/invalidity of the switching protection at the time of restoration after an alarm is generated for a clock signal being selected. Also, the system has a configuration in which the quality information of a clock signal received and extracted from one line and changed to the quality information of the clock signal sent out to the other line is compared with the quality information of the clock signal received and extracted from the other line. In the case where the two quality information are the same, the loop is determined as closed, and a clock signal with a "do not use" (DUS) message attached thereto is sent out to the other line.

BRIEF DESCRIPTION OF THE DRAWINGS

The above object and features of the present invention will be more apparent from the following description of the preferred embodiments, when read in conjunction with the accompanying drawings, wherein:

FIG. 2 is a diagram for explaining a section overhead in a packet transmitted from or received by the network equipment shown in FIG. 1;

FIG. 3 is a diagram for explaining a frame format of the packet;

FIG. 5 is a diagram for explaining a synchronization management table in the network equipment shown in FIG. 1;

FIG. 6 is a diagram for explaining a quality control table in the network equipment shown in FIG. 1;

FIG. 9 is a diagram for explaining unit codes and the corresponding contents of control used for identifying the unit type;

FIG. 16 is a diagram for explaining the essential parts of the prior art.

DESCRIPTION OF THE PREFERRED EMBODIMENTS

Figure 1:
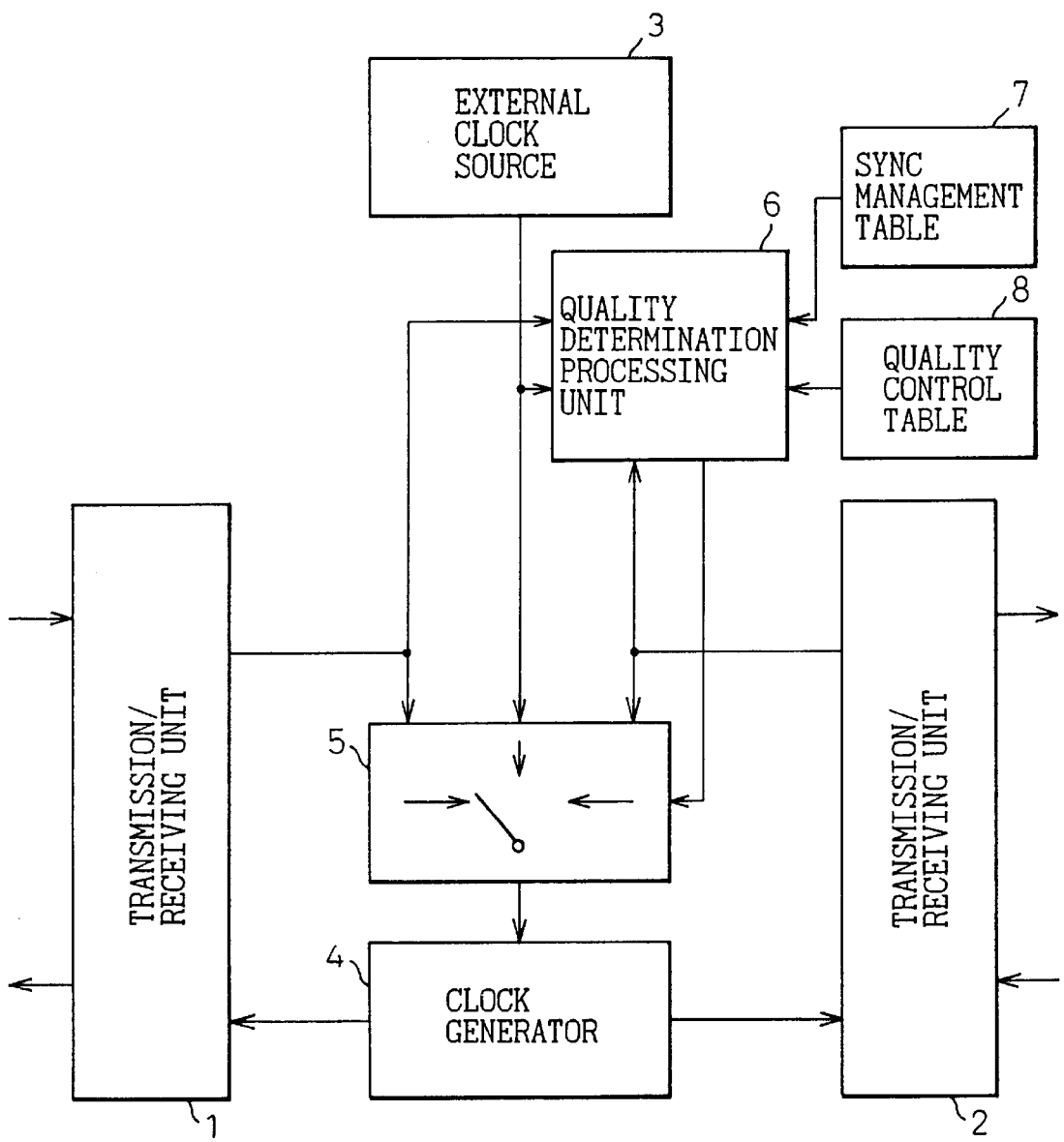
FIG. 1 is a diagram for explaining the essential parts of a network equipment in a SDH network system according to an embodiment of the present invention.

Before describing embodiments of the invention, prior art will be described with reference to FIG. 16.

FIG. 16 is a diagram for explaining the essential parts of a conventional network equipment. Reference numerals 51 and 52 represent transmission/receiving units, numeral 53 an external clock source, numeral 54 a clock generator, and numeral 55 a clock switching unit. These components make up the essential parts related to clock signals of the network equipment (NE) in a synchronous network system. The transmission/receiving units 51 and 52 are adapted to extract a clock signal from the received data through the synchronous network and input it to the clock switching unit 55. In the case where nodes are connected by an optical transmission path and an optical signal is transmitted, for example, the transmission/receiving unit in each node including the NE shown in FIG. 16 converts the received optical signal into an electrical signal to extract the clock signal component.

The clock generator 54 has a configuration of a phase synchronizing circuit, i.e., a phase locked loop (PLL) circuit, for generating a clock signal in synchronism with the clock signal selectively switched and output by the clock switching unit 55. When the selectively switched and output clock signal is turned off, the clock generator 54 realizes a hold-over function for continuing to generate a clock signal with an immediately preceding phase or realizes a function for generating an internal clock signal generated independently from the selectively switched and output clock signal. The output clock signal of this clock generator 54 is supplied to the transmission/receiving unit 51 or 52, which sends out an optical signal to a light transmission path in synchronism with the input clock signal. Thus, synchronous data transmission and receiving is made possible within the synchronous network.

The clock switching unit 55, on the other hand, is preset by the operator to select a clock signal from the clock signal received and extracted by the transmission/receiving unit 51 or 52 or the clock signal from the external clock source 53, and inputs the selected clock signal as a master clock signal to the clock generator 54. When the selected clock signal is turned off, the clock generator 54 continues to generate a clock signal in the hold over state or to generate the internal clock signal by an internal oscillator. Therefore, when the selected input clock signal is turned off to generate an alarm signal or the like, the operator must control the clock switching unit 55 to select the clock signal in the hold state or the clock signal by the internal oscillator to be input to the clock generator 54.

The above-described conventional network equipment has problems as described above.

FIG. 1 is a diagram for explaining the essential parts of a transmission apparatus according to an embodiment of the invention. In FIG. 1, reference numerals 1 and 2 designate a transmission/receiving units, numeral 3 an external clock source, numeral 4 a clock generator, numeral 5 a clock switching unit, numeral 6 a quality determination processing unit, numeral 7 a synchronization management table, and numeral 8 a quality control table. These components are the essential parts of a transmission apparatus in a synchronous network system. Hereinafter, the transmission apparatus is referred to as a network equipment.

In the synchronous network system, means has been proposed for transmitting and receiving quality information of a clock signal. The quality determination processing unit 6 controls the clock switching unit 5 with reference to the synchronization management table 7 and the quality control table 8 based on the quality information of the clock signal. It is also possible to include a configuration for notifying the operator with a message, a light, a sound or the like when a quality deterioration of the clock signal is detected to control the clock switching unit 5, by the quality determination processing unit 6.

FIG. 2 is a diagram for explaining a section overhead for STM-1 (Synchronous Transfer Mode level 1) (150 Mbps) of a SDH (Synchronous Digital Hierarcy) packet transmitted or received by the network equipment shown in FIG. 1. In FIG. 2, reference characters A1 and A2 designate frame sync bytes, character C1 an identification byte, character B1 a section error monitoring byte, character E1 an order wire channel byte, character F1 a fault specifying byte, characters D1 to D3 data communication bytes for a relay section, character B2 a line error monitoring byte, character K1 a switching control byte, character K2 a status transfer byte, characters D4 to D12 data communication bytes for a multiplex section, characters S1 and S2 transfer bytes for clock quality information or the like, and character E2 a line orderwire channel byte. According to the embodiment of the present invention, quality information SSMB (synchronization status message byte) of the clock signal is transferred by using the four bits in each of the S1 bytes.

FIG. 3 is a diagram for explaining a frame format of the SDH frame of multi-frame configuration. In FIG. 3, SMF represents supermultiplexed frames. The SDH frame shown in FIG. 3 is generated by the external clock source 3 in FIG. 1. Quality information of an external clock signal similar to the SSMB of S1 byte described above is transferred by using bits Sa4 to Sa8. When the clock signal from the external clock source 3 is selected, the quality information of the clock signal of this multiframe configuration is added, for example, to the clock signal from the external clock source 3 and is transferred to the outside of the network equipment shown in FIG. 1.

Figure 4:
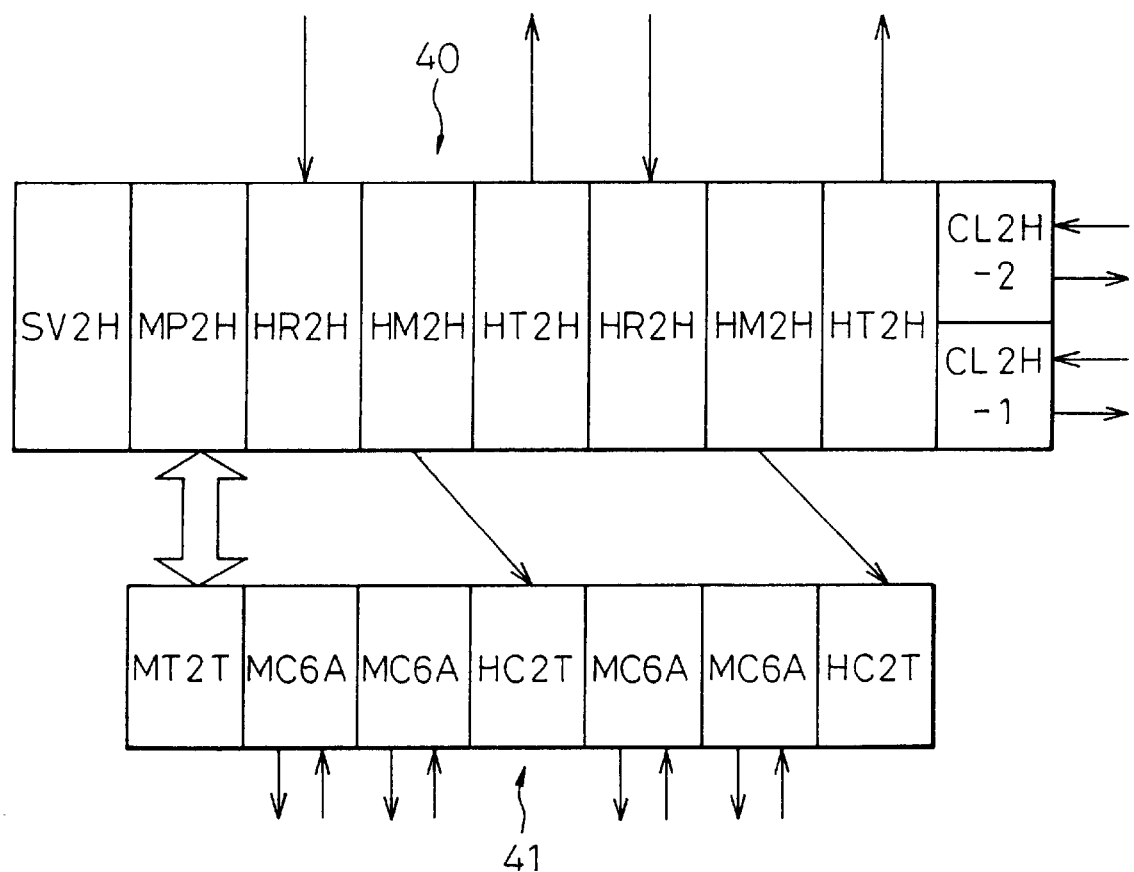
FIG. 4 is a diagram for explaining clock signals between shelves as examples of transmission/receiving units in the network equipment shown in FIG. 1.

FIG. 4 is a diagram for explaining clock signals between shelves as examples of the transmission/receiving units 1 and 2, and schematically shows their shelf configuration. In FIG. 4, 40 represents a main shelf which is an example of the transmission/receiving unit 1 or 2 in FIG. 1, and 41 represents a subsidiary self which communicates with the shelf 40. In the shelf 40, reference characters SV2H and MP2H designate a control system unit, character HR2H a light receiving unit, character HM2H a clock control unit, character HT2H a light transmission unit, and characters CL2H-1 and CL2H-2 external clock transmission/receiving units. In the shelf 41, character MP2T a control unit, character MC6A a light transmission/receiving unit, and character HC2T a control unit. Signals are transferred between the control unit MP2H in the shelf 40 and the control unit MP2T in the shelf 41. Solid arrows in FIG. 4 indicate the direction of transfer of the clock signal. The unit type is recognized by a controller not shown in FIG. 4 but shown in FIG. 8, and controlled in accordance with the result of recognition.

For example, the control system unit MP2H in the shelf 40 identifies the type of the external clock transmission/receiving unit CL2H-2. In accordance with the result of identification of the unit type, the type of the clock signal transferred from the clock control unit HM2H to the external clock transmission/receiving unit CL2H-2 is selected. In the case of the unit type for handling a digital clock signal, for example, the digital clock signal is transferred.

The light receiving unit HR2H on the main shelf 40 receives an optical signal including a clock signal, and the light transmission unit HT2H transmits an optical signal synchronized with the clock signal. A clock signal is transmitted or received between an external clock apparatus and the external clock transmission/receiving unit CL2H-1 or CL2H-2. The clock signal is also transferred from the clock control unit HM2H on the main shelf 40 to the control unit HC2T on the subsidiary shelf 41. In synchronism with the clock signal, the optical transmission/receiving unit MC6A transmits and receives the optical signal.

As described above, the network equipment in the synchronous network system fetches a plurality of clock signals and selectively uses a clock signal having a good quality based on the quality information of the clock signals transferred through the S1 bytes in the SOH shown in FIG. 2 or Sa4 to Sa8 bits in the SDH multiframe shown in FIG. 3. To select the clock signal having a good quality, a priorities of selecting a receiving clock signal and a transmission clock signal are registered by a command in a clock list not shown in the figures. Also, a threshold of the quality level for each clock signal is set in the synchronization management table 7 based on the clock signal quality information. Since an operator can set an arbitral value as the threshold of the quality level in the synchronization management table 7, the threshold of the quality level is variable. In the order in the clock list, as an example, a clock signal received and extracted by the transmission/receiving unit 1 may be provided with a first priority PRI1, a clock signal received and extracted by the transmission/receiving unit 2 may be provided with a second priority PRI2, and the clock signal from the external clock source 3 may be provided with a third priority PRI3.

Then, the quality level based on the quality information of the clock signal having the priority PRI1 selectively switched and output from the clock switching unit 5 in accordance with the priorities in the clock list is compared with the threshold quality level set in the synchronization management table 7. For a clock signal having a quality level deteriorated beyond the variable threshold level, the clock switching unit 5 is controlled in such a manner as to selectively switch and output the clock signal having the next priority PRI2 registered in the clock list. In the case where quality level of all the clock signals with the priorities PRI1 to PRI3 is deteriorated beyond the quality level threshold set, on the other hand, the clock generator 4 generates a clock signal according to the hold over state in which a clock signal having an immediately preceding phase is generated, or a built-in oscillator generates a clock signal independently.

The synchronization management table 7 includes, as shown in FIG. 5, a synchronization message SYNCMSG, a revertive control RVRTV, a hold over/internal clock automatic retrieve STIMR, virtual synchronization messages GP1CODE and GP2CODE for the clock signal of the optical signal of 2.4 GHz, primary and secondary virtual synchronization messages HZCODE-P and HZCODE-S for the analog external clock signal of 2 MHz, primary and secondary virtual synchronization message BITCODE-P and BITCODE-S for the digital external clock signal (2 Mbits, SSM-adapted 2 Mbits), a quality level threshold QLTHMCLK of the clock signal for synchronization, a quality QLTHOUT of an outgoing clock signal to be sent out of the network equipment, and the switching protection time ERRFREE.

When the synchronization message SYNCMSG is "Y" indicating "yes", a Synchronization Status Message Byte (SSMB) of four bits in a quality management table shown in FIG. 6 is made to correspond to a quality level. The SSMB is included in the S1 byte in the SOH shown in FIG. 2.

When the SYNCMSG is "N" indicating "no", the SSMB is not made to correspond to a quality level. That is, the S1 byte in the received SOH is neglected.

When the revertive control RVRTV is "Y" indicating "yes", a revertive mode of operation is performed in which a clock signal is changed from the one having a lower priority to the one having a higher priority after a failure in the system using the clock signal having the higher priority is recovered.

When the revertive control RVRTV is "IN" indicating "no", such a reverse mode of operation is not performed.

When the hold over/internal clock automatic retrieve STIMR is "Y" indicating the STIMR is valid, the clock signal under the hold over state or the internal clock signal generated in the own network equipment is reverted to the clock signal in the network. When the STIMR is invalid, the above revertive mode of operation is not performed.

When the virtual synchronization message GP1CODE or GP2CODE is set to have a certain code such as a 4-bit code xxxx for example, the network equipment neglects the S1 byte in the receiving signal along one line or along another line, respectively. When GP1CODE or GP2CODE is set to "N" indicating "no", the network equipment uses the S1 byte in the receiving signal along the one line or along the other line, respectively.

When an analog clock signal is used, a maintenance operator sets the HZCODE-P or the HZCODE-S as a code of, for example, four bits which represents the quality level of the analog clock signal.

When the BITCODE-P or BITCODE-S is set to have a 4-bit code xxxx for example, the receiving Sa4-Sa8 code is neglected and the set code xxxx is used as the quality level of the digital clock signal. When the BITCODE-P or BITCODE-S is set to "N" indicating "no", the receiving Sa4–Sa8 code is used as the quality level of the clock signal.

The quality level threshold QLTHMCLK is provided according to an embodiment of the present invention. The QLTHMCLK is set by an operator to have a code of 4 bits for example. When the quality level of the received clock signal is lower than the QLTHMCLK, an alarm is generated.

The quality of QLTHOUT is the quality level of the clock signal which is output from the network equipment.

When the switching protection time ERRFREE is set to be "Y", a switching protection time is valid so that the reverting process is carried out after a predetermined protection time after the recovery of the failure.

When the ERRFREE is set to be "N", the switching protection is not performed.

FIG. 6 is a diagram for explaining the quality control table 8 in which four bits of Synchronous Status Message Byte (SSMB) of each S1 byte are shown to a correspond to a quality level QL. SSMB0000, for example, indicates the quality level QL=2, and SSMB0001 the quality level QL=6. The smaller the quality level, the better the quality is. SSMB1111, on the other hand, indicates a prohibited use of the clock signal.

Briefly explaining the operation of the network equipped shown in FIG. 1, the quality threshold QLTHMCLK of the synchronizing clock signal, the quality QLTHOUT of the clock signal to be sent out of the network equipment, and the switching protection time ERRFREE valid/invalid are set in the synchronization management table 7 shown in FIG. 5. The quality determination processing unit 6 compares the quality level of the clock signal selected based on the clock list with the quality level threshold QLTHMCLK set in the synchronization management table 7, and in the case where the quality level QL of QLTHMCLK is smaller than the quality level QL of the selected clock signal TMG, determines that the quality of the master clock signal is deteriorated. In the case where the quality level QLTHOUT is smaller than the quality level QL of the outgoing clock signal TMGOUT, on the other hand, the quality determination processing unit 6 judges that the quality of the transmission clock signal is deteriorated. By judging the quality deterioration in this manner, the clock switching unit 5 is controlled in such a manner as to switch the clock signal to the one having the next priority with reference to the clock list.

In the case where the quality of the clock signal is deteriorated, therefore, the clock signal can be automatically and rapidly switched to the one set having the next priority among a plurality of clock signals. The communication can thus be continued while holding a high quality of the clock signal in the synchronous network system. Also, when the quality of the master clock signal is judged to be deteriorated, the operator can be warned. As a result, the operator can recognize the deterioration of the clock signal before the system is turned to a hold over state.

Figure 7:
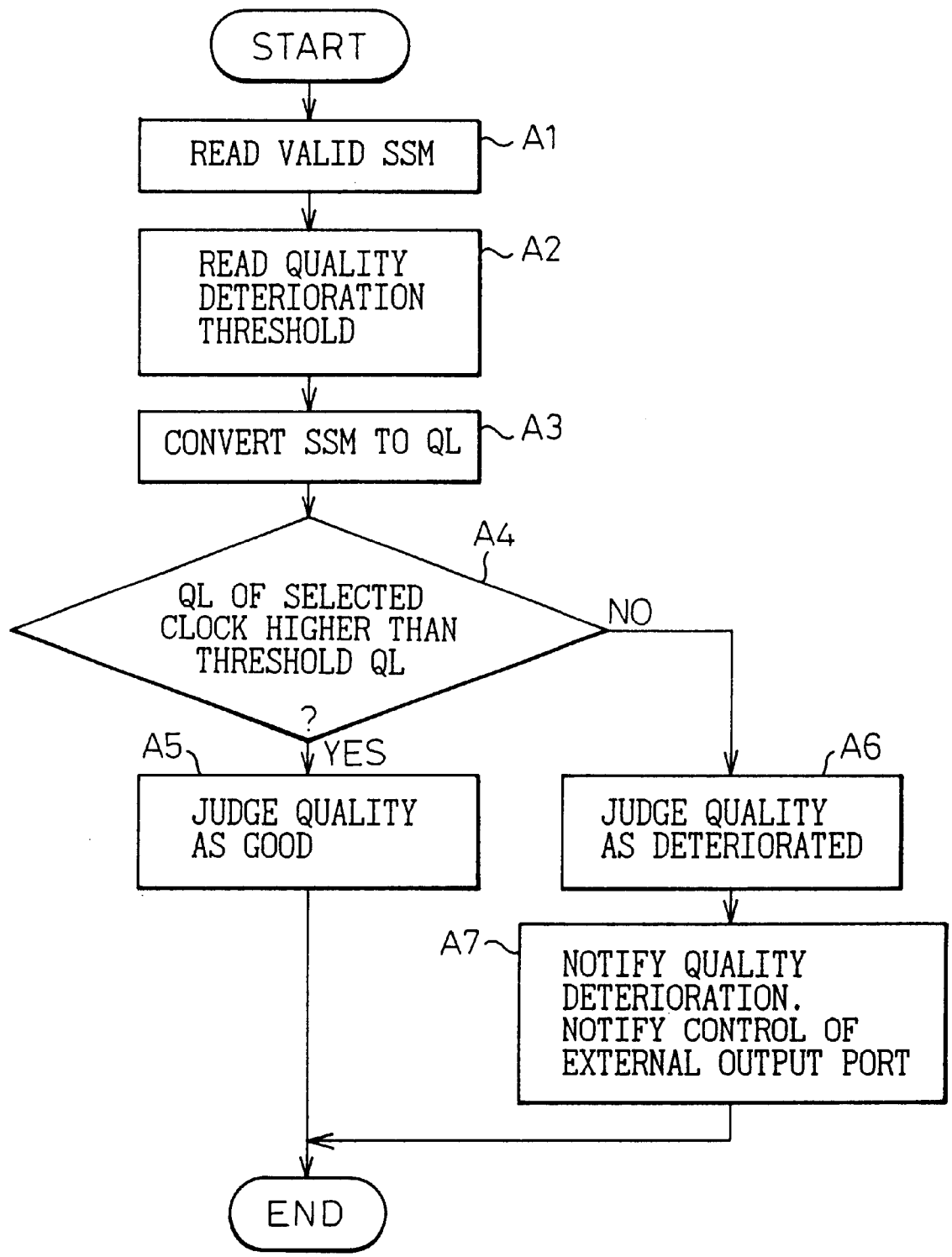
FIG. 7 is a flowchart for the clock quality deterioration determination process according to an embodiment of the present invention.

FIG. 7 is a flowchart for the clock quality deterioration determination process performed by the quality determination processing unit 6. In FIG. 7, at step A1, the SYNCMSG in the synchronization management table 7 shown in FIG. 5 is read to determine whether or not the received S1 byte is valid. If the SYNCMSG is "Y", the received S1 byte is valid so that the received S1 byte is determined as the valid synchronization status message byte (SSMB). If the SYNCMSG is "N", the value set in the table 7 is valid so that the value of the HZCODE-P, HZCODE-S, BITCODE-P, or BITCODE-S is read and determined as the valid (SSMB).

Then, at step A2, the value of the QLTHMCLK is read from the table 7 shown in FIG. 5.

Then, at step A3, the valid SSSB is converted to a quality level QL with reference to the quality management table 8 shown in FIG. 6.

At step A4, the quality level QL of the valid SSMB corresponding to the selected clock signal is compared with the quality threshold QLTHMCLK set in the synchronization management table 7 shown in FIG. 5. When the numerical value of the quality level QL of the valid SSMB corresponding to the selected clock signal is smaller than the numerical value of the QLTHMCLK, that is, when the quality of the valid SSMB is higher than the threshold, the selected clock signal is judged as superior at step A5.

When the numerical value of the quality level QL of the valid SSMB is larger than the numerical value of the QLTHMCLK, that is, when the quality of the valid SSMB is lower than the threshold, the selected clock signal is judged as inferior at step A6, so that a quality, deterioration and an external output port control are notified at step A7. According to the result of judgment, the clock switching unit 5 is controlled in such a manner as to switch the clock signal to the one having the next priority with reference to the clock list.

Figure 8:
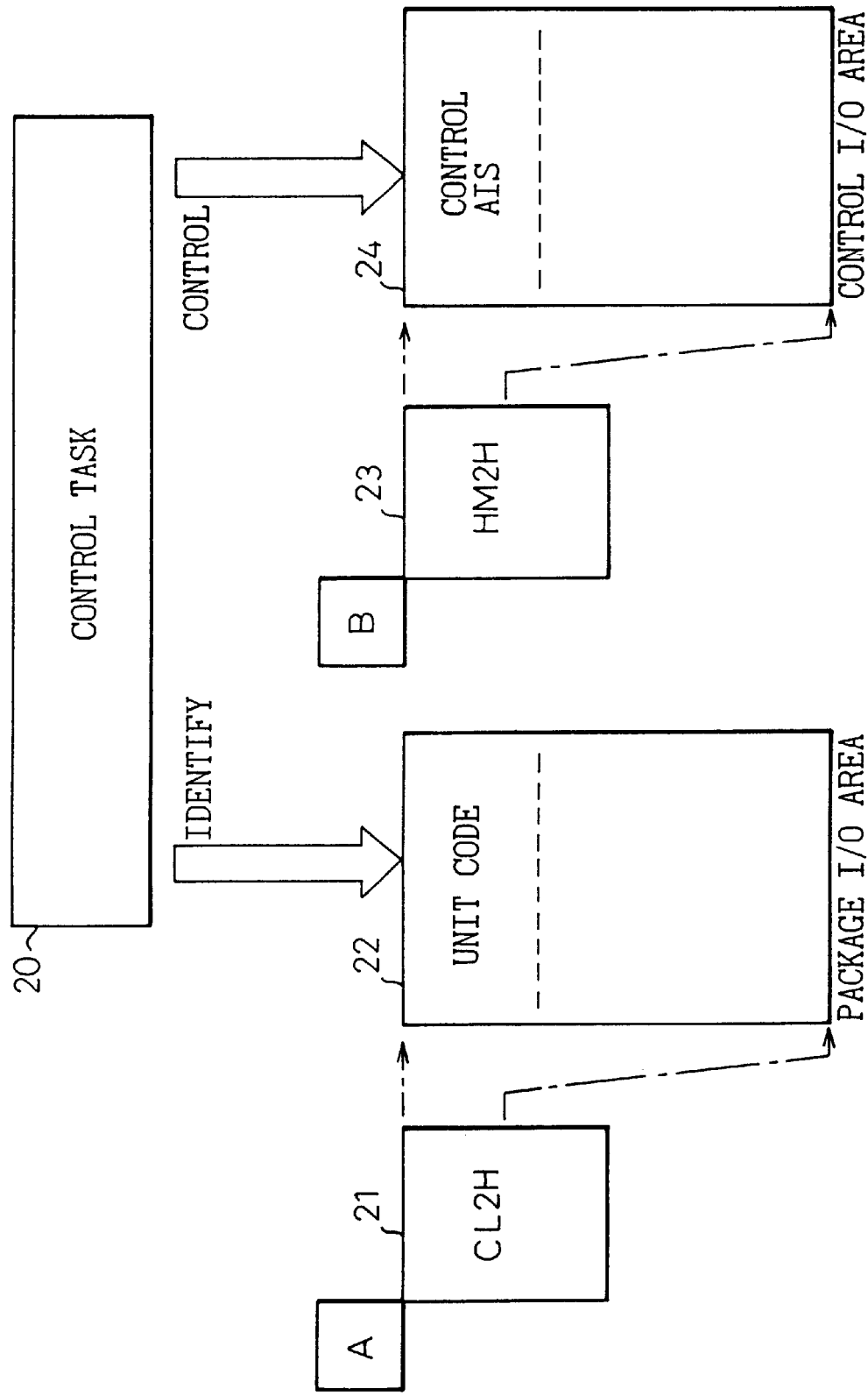
FIG. 8 is a diagram for explaining an automatic unit identification process for identifying a type of a unit in slot of shelf shown in FIG. 4 according to an embodiment of the present invention.

FIG. 8 is a diagram for explaining an automatic unit identifying process in one of the shelves shown in FIG. 4. As shown in FIG. 4, the shelf includes a plurality of units SV2H, MP2H, HR2H, . . . , CL2H-1, and CL2H-2. The type of each unit is one of a plurality of types. For example, the transmission/receiving unit CL2H 21 is one of three types. To identify the type of the unit, a unit code is provided in a package I/O area 22 of the unit CL2H 21.

On the other hand, in a control I/O area of the clock control unit HM2H 23, the contents of the AIS control corresponding to the types of the transmission/receiving unit CL2H 21 are stored.

When the valid SSMB is determined, a control task 20 in the control unit MP2H reads the unit code from the package I/O area 22, and, based on the read unit code, controls the control I/O area 24 to output a corresponding AIS to stop the output.

FIG. 9 is a diagram for explaining the relation between the read unit code and the contents of control in the I/O area 24. For example, the unit of the unit code 71 uses, when the quality is good, a clock signal (analog clock signal) of sinusoidal wave of 2 MHz, as indicated by "Send out 2 MHz" and in the case where the quality is deteriorated, on the other hand, the output of the clock signal is stopped. Also, the unit of the unit code 72 uses, when the quality is good, a digital clock signal of 2 MHz, as indicated by "Send out 2 MBIT", and when the quality is deteriorated, on the other hand, the asynchronous AIS is sent out. The unit of the unit code 73 uses, when the quality is good, a 2-MHz digital clock signal corresponding to SSMB, as indicated by "Send out 2MBITSSMB", while in the case where the quality is deteriorated, the asynchronous/synchronous AIS is sent out.

In FIG. 8, for example, the control task 20 reads one of the unit codes 71 to 73 thereby to automatically identify the type of clock signal to be used by the mounted unit. When the unit of the unit code 71 is identified to be mounted, for example, and when the quality is deteriorated, the output is stopped and the AIS is not sent out as can be seen from the table shown in FIG. 9. In the case where the unit of the unit code 73 is mounted, on the other hand, and when the quality is deteriorated, the synchronous or asynchronous AIS is sent out.

Figure 10:
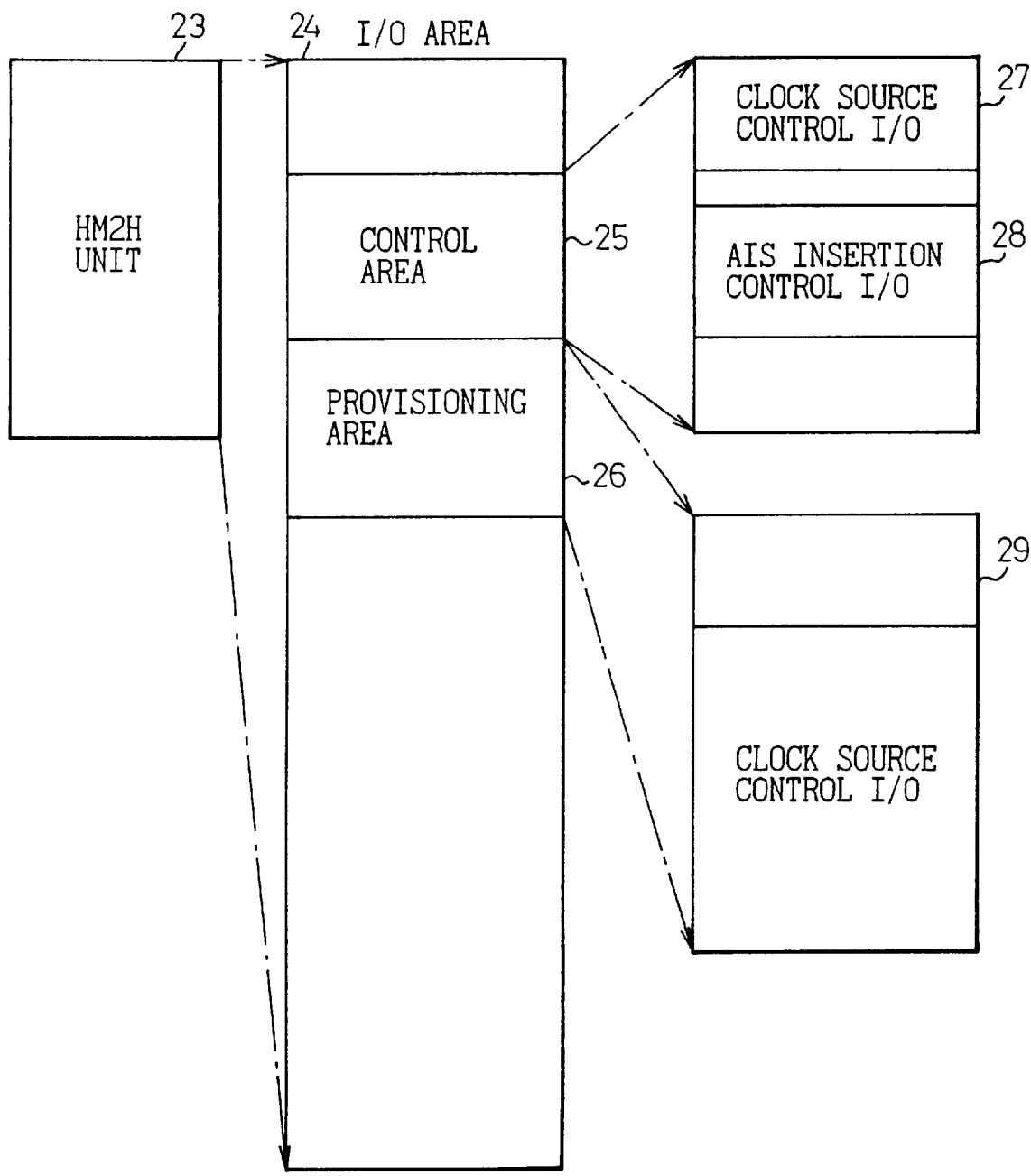
FIG. 10 is a diagram for explaining a control I/O area shown in FIG. 8.

FIG. 10 is a diagram for explaining the control of the clock-related operation in the control I/O area 24 of the control unit HM2H23. As shown in FIG. 10, the control I/O area 24 includes a control area 25 which includes a clock source control I/O area 27 and an AIS insertion control I/O area 28. Also, the control I/O area 24 includes a provisioning area 26 which includes a clock source control I/O area 29.

The control area 25 includes a clock source control I/O area 27 for selectively controlling, as clock type, a first clock signal (LINE) received and extracted from the line, a second clock signal (EXTERNAL) from the external clock source 3, a third clock signal (HOLD OVER) in the hold over state, or a fourth clock signal (INTERNAL) from an internal clock generator. The provisioning area 26, on the other hand, selects a primary or secondary signal of the first, and the second clock signals in accordance with the contents in the clock source control I/O area 29.

When the asynchronous AIS is to be transmitted by selecting the internal clock generator in the clock source control I/O area 29 of the provisioning area 26, and by controlling the AIS insertion control I/O area 28 in the control area 25.

When the synchronous AIS is to be sent out, on the other hand, the clock source of the transmission clock signal TMGOUT is selected, and, the clock source control I/O area 29 in the provisioning area 26 is controlled, the clock source control I/O area 27 in the control area 25 is controlled, and then the AIS insertion control I/O area 28 in the control area 25 of the external output port unit is controlled when the result of identification of the unit code indicates to output the synchronous AIS.

Figure 11:
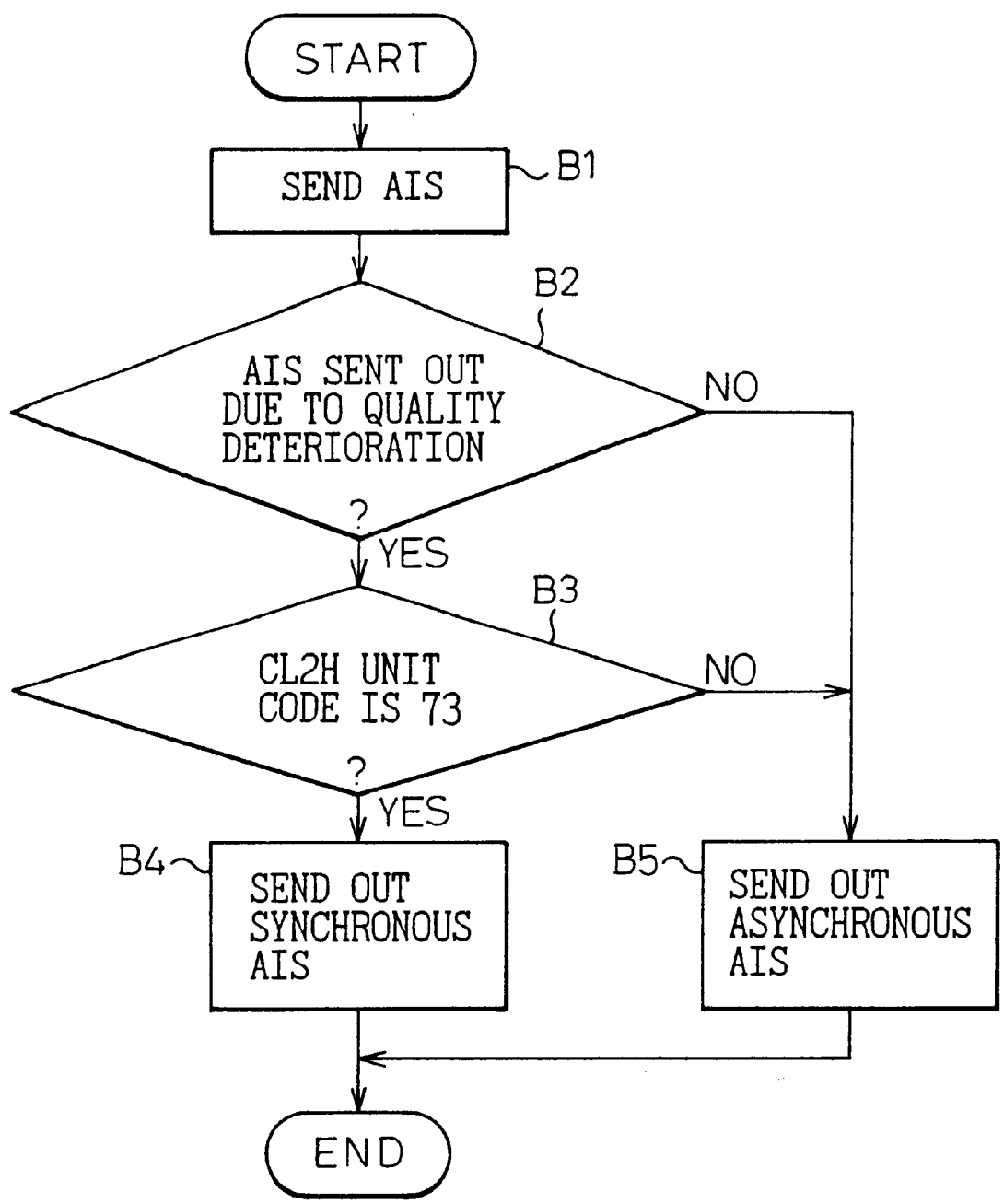
FIG. 11 is a flowchart for explaining the synchronous/asynchronous AIS transmission determination process according to the identification of the unit type.

FIG. 11 is a flowchart for synchronous/asynchronous AIS transmission determination process when the unit code is 73. At step B1, the AIS is determined to be sent out. Then, at step B2, it is judged whether the AIS transmission is due to the quality deterioration of the clock signal or not. In the case where the quality deterioration of the clock signal is not involved, the asynchronous AIS is sent out at step B5. In the case where the clock signal is deteriorated in quality, on the other hand, it is judged by the control task 20 (FIG. 8) whether the unit code of the external clock transmission/receiving unit CL2H (FIGS. 4 and 8) is "73" (FIG. 9) or not. In the case where the unit code is "72" but not "73", the asynchronous AIS is sent out at step B5. In the case where the unit code is "73", on the other hand, the synchronous AIS is sent out at step B4. In other words, the control task 20 reads the unit code of the external clock transmission/receiving unit CL2H, and in the case where the unit code is "73", controls the I/O area 24 of the clock control unit HM2H controlled by the control AIS and sends out the synchronous AIS.

Figure 12:
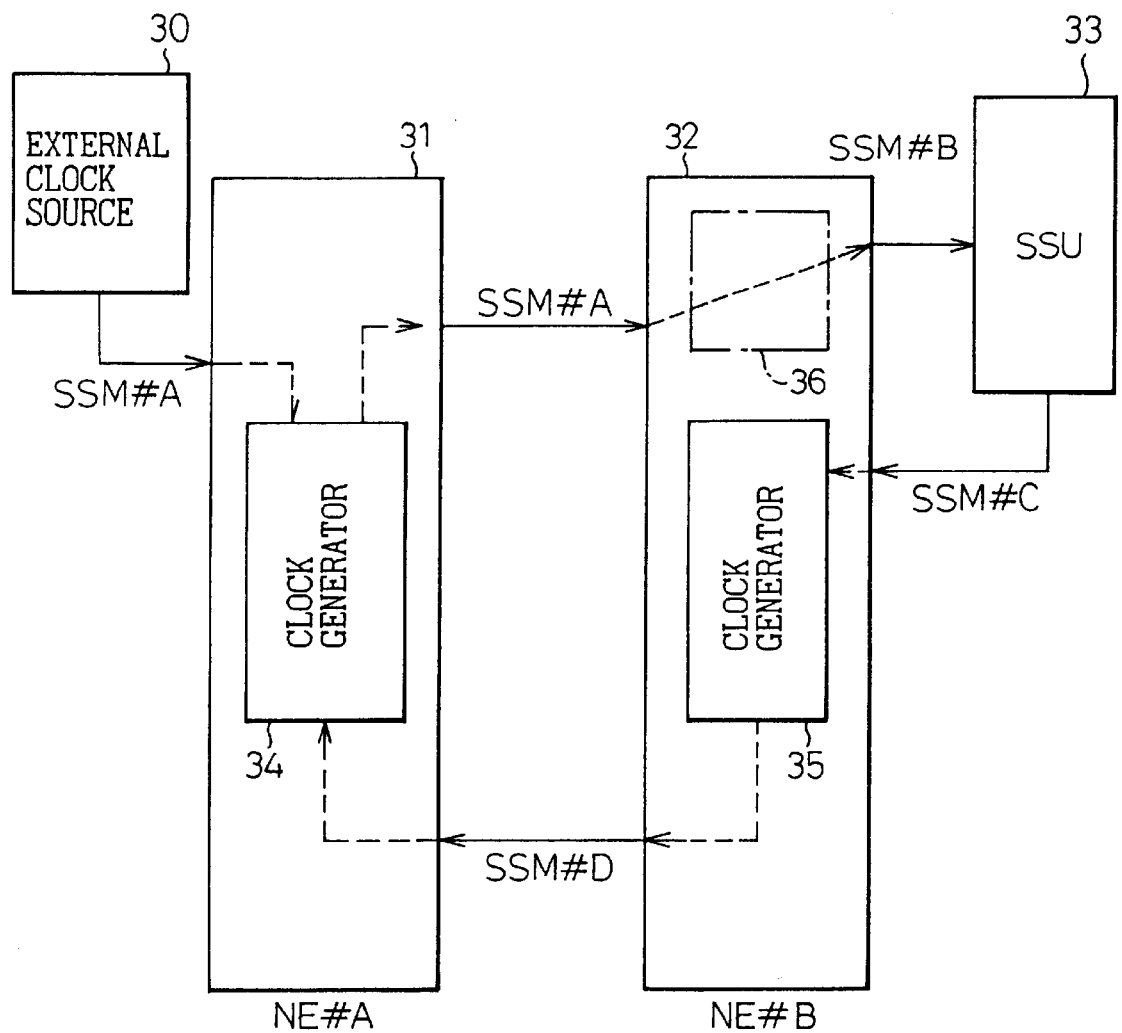
FIG. 12 is a diagram for explaining a virtual SSM according to still another embodiment of the present invention.

FIG. 12 is a diagram for explaining a virtual Synchronous Status Message (SSM) according to another embodiment of the present invention. In a synchronous network system including the network equipments (NE#A, NE#B) 31 and 32, a clock generator 34 in the network equipment 31 generates a clock signal by selecting a clock signal from an external clock source 30, while a clock generator 35 in the network equipment 32 generates a clock signal by selecting a clock signal from an external clock correction unit (SSU) 33. Then, the clock signal is transmitted along the route indicated by arrows. SSM#A to SSM#D designate quality information of the clock signal expressed by the S1 byte of the section overhead shown in FIG. 2.

The clock signal is deteriorated while being transferred through the synchronous network system. To prevent the deterioration, a plurality of external clock correction units are provided at predetermined intervals of transfer distance in the synchronous network system. In FIG. 12, for the sake of simplicity, only a single external clock correction unit 33 is shown. Each external clock correction unit 33 prevents the deterioration of the clock signal by extracting it and taking the timing thereof repeatedly. A quality information changing unit 36 in the network equipment 32 has the function of adding or changing the quality information of the clock signal with the S1 byte described above. A system using the function of the quality information changing unit 36 in this way is referred to as a virtual SSM.

In the synchronous network system described above, assume that a fault occurs in the external clock source 30. Then, the clock generator 34 of the network equipment 31 generates a clock signal of a hold over state or select the clock signal from the network equipment 32. Then, the clock signal is transferred through a loop including the clock generator 34, the external clock correction unit 33, the clock generator 35 and the clock generator 34 in that order. In this case, in spite of the presence of the external clock correction unit 33, the clock signal is not generated based on the clock signal from the high-accuracy external clock source 30, and therefore the clock signal is deteriorated in quality.

In view of this, the quality information SSM#A of the clock signal received and extracted from the line on one side, of the network equipment 32, i.e. from the output line of the network equipment 31 is compared with the quality information SSM#C of the clock signal received and extracted from the line on other side of the network equipment 32, i.e. from the output line of the external clock correction unit 33. If SSM#A=SSM#C, then the regulation stipulates that the "do not use" message DUS represented by the SSMB1111 in FIG. 6, for example, is sent out to the line on one side as the quality information SSM#D of the clock signal.

In the case where the quality information is not attached to the clock signal received and extracted from the line, the quality information changing unit 36 can add it, or the quality information changing unit 36 can change the quality information of the clock signal, if added. In the case where the virtual SSM is set by using the function of the quality information changing, unit 36, the quality information SSM#A of the clock signal received and extracted from the line on one side of the network equipment 32 is changed to, say, SSM#B and sent out to the external clock correction unit 33. In this case, SSM#B≠SSM#A. Even when SSM#B=SSM#C, therefore, SSM#A≠SSM#C, and the conditions set according to the foregoing regulation fail to be met. Thus the problem is posed that the "do not use" message DUS is not sent out even in the closed loop state due to the fault in the external clock source 30.

In view of this, according to an embodiment of the invention, the quality information SSM#B attached to the clock signal sent out on the external clock correction unit 33 side of the network equipment 32 is compared with the quality information SSM#C of the clock signal received and extracted from the line on the external clock correction unit 33 side. If SSM#B=SSM#C, the quality information SSM#D of the clock signal is sent out. as a "do not use" message DUS. As a result, the closed loop state which otherwise might occur due to the fault of the external clock source 30 described above can be avoided.

Specifically, in the virtual SSM sent out by changing the quality information of the clock signal by the quality information changing unit 36, if, for example, that the quality information SSM#A of the clock signal received and extracted from the line on one side of the network equipment 32 is identical to the quality information SSM#C of the clock signal received and extracted from the line on the other side (i.e. in the case where the SSM code shown in the quality control table of FIG. 6 is the same), and if that the quality information SSM#B of the clock signal sent out to the line on the other side is identical to the quality information SSM#C of the clock signal received and extracted from the line on the other side of the transmission apparatus 32, then the "do not use" message (DUS) is attached as as the quality information SSM#D of the clock signal and sent out to the line on one side of the network equipment 32.

Figure 13:
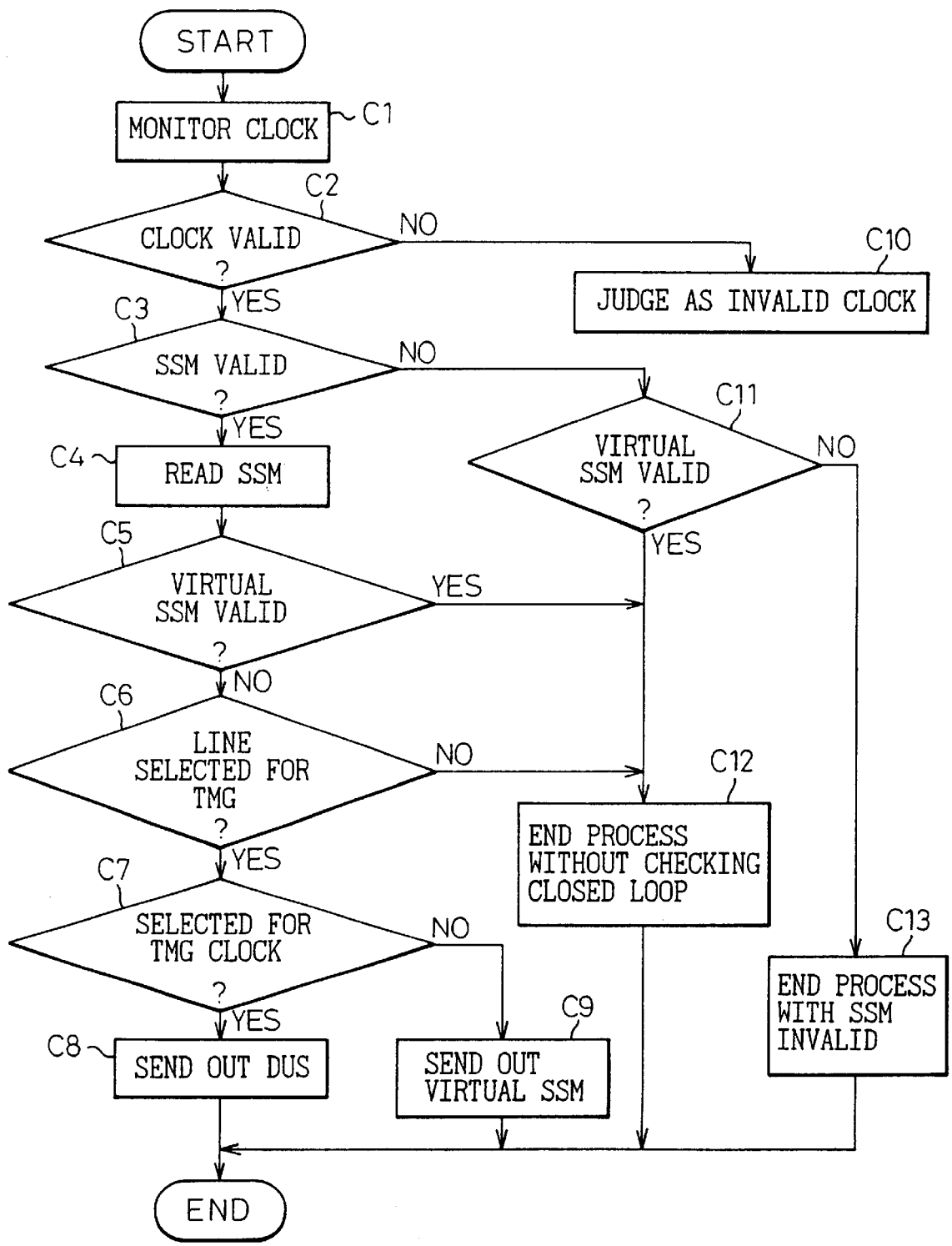
FIG. 13 is a flowchart for explaining a closed loop determination process in the virtua SSM shown in FIG. 12.

FIG. 13 is a flowchart for explaining the closed loop determination process in the network equipment 32. In the virtual SSM of FIG. 12, at step C1, the clock signal is monitored. At step C2, it is judged whether the received clock signal is valid or invalid according to whether the "do not use" message DUS is attached or not. In the case where the clock signal is invalid, it is processed as an invalid clock signal at step C10. In the case where the clock signal is valid, on the other hand, it is judged whether the synchronization status message (SSM) is valid or not (C3) according to the SYNCMSG in the table shown in FIG. 5. If the SSM is valid, the process is executed for reading the SSM (C4) and it is judged whether the virtual SSM is valid or not (C5), that is, in the case of FIG. 12, it is judged whether or not SSM#B≠SSM#C.

In the case where the virtual SSM is not valid, i.e., if SSMB=SSMC, it is judged whether the line is selected for the master clock signal TMG (the clock signal extracted from the received signal through the transmission path) (C6), and in the case where the line is so selected, it is judged whether the line is selected for the TMG clock signal (C7). If the line is so selected, it is judged that the closed loop state prevails, and a "do not use" message DUS is sent out (C8). If the line is not so selected, on the other hand, the virtual SSM is sent out (C9).

In the case where the judgment as to the validity of SSM in step C3 is negative, it is judged whether the virtual SSM is valid or invalid (C11). In the case where it is invalid, the process is terminated as an invalid SSM (C13). In the case where the SSM is valid, in the. case where the judgment as to the validity of the virtual SSM in step C5 is affirmative, or in the case where the line is not selected for the TMG in step C6, then the process is terminated without the closed loop check.

Figure 14:
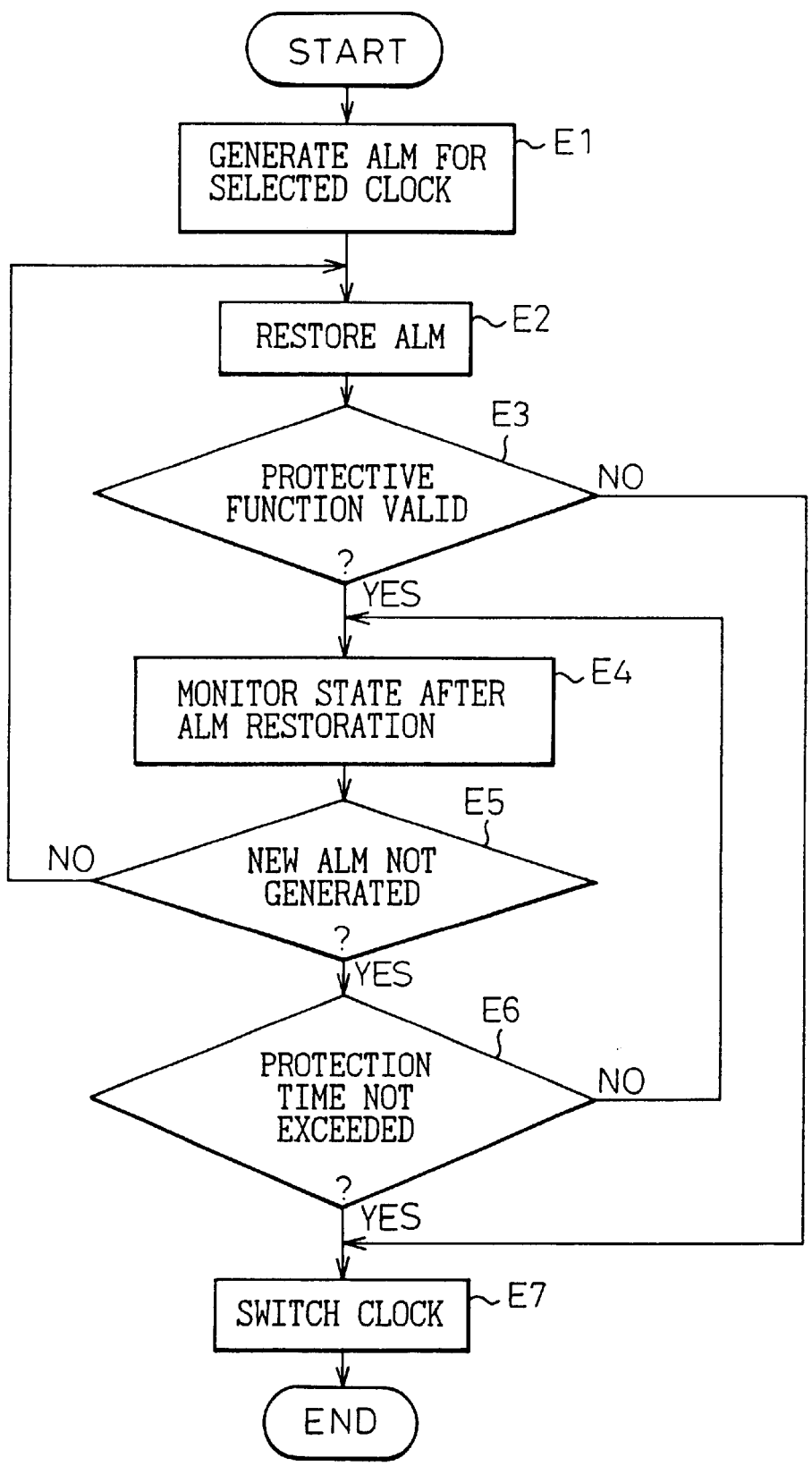
FIG. 14 is a diagram for explaining a clock switching protection process according to still another embodiment of the present invention.

FIG. 14 is a flowchart for explaining a clock switching protection process according to still another embodiment of the present invention. In FIG. 14, an alarm ALM is generated (El) when the quality level QL of a clock signal selectively switched and output from the clock switching unit 5 is deteriorated or when the clock signal is turned off. When the alarm ALM is restored next (E2), it is judged whether the protection function is valid or not (E3). Specifically, the quality determination processing unit 6 for controlling the clock switching unit 5 judges whether the switching protection time ERRFREE (Y/N) is set as valid (Y) or invalid (N) in the synchronization management table 7 (FIGS. 1 and 5).

In the case where the switching protection time ERRFREE is set as invalid, the clock switching process is performed by restoration of the alarm ALM (E7). If ERRFREE is set as valid, on the other hand, the state after restoration of the alarm ALM is monitored (E4), and it is judged whether or not the alarm ALM has been newly generated (E5). In the case where the alarm ALM is newly generated, the process proceeds to step E2, while if no new alarm ALM is generated, it is judged whether the protection time is exceeded or not (E6). If the protection time is not exceeded, the process proceeds to step E4, while if it is exceeded, on the other hand, it indicates that the switching protection time has elapsed, and, therefore, the clock switching process is executed (E7).

Figure 15:
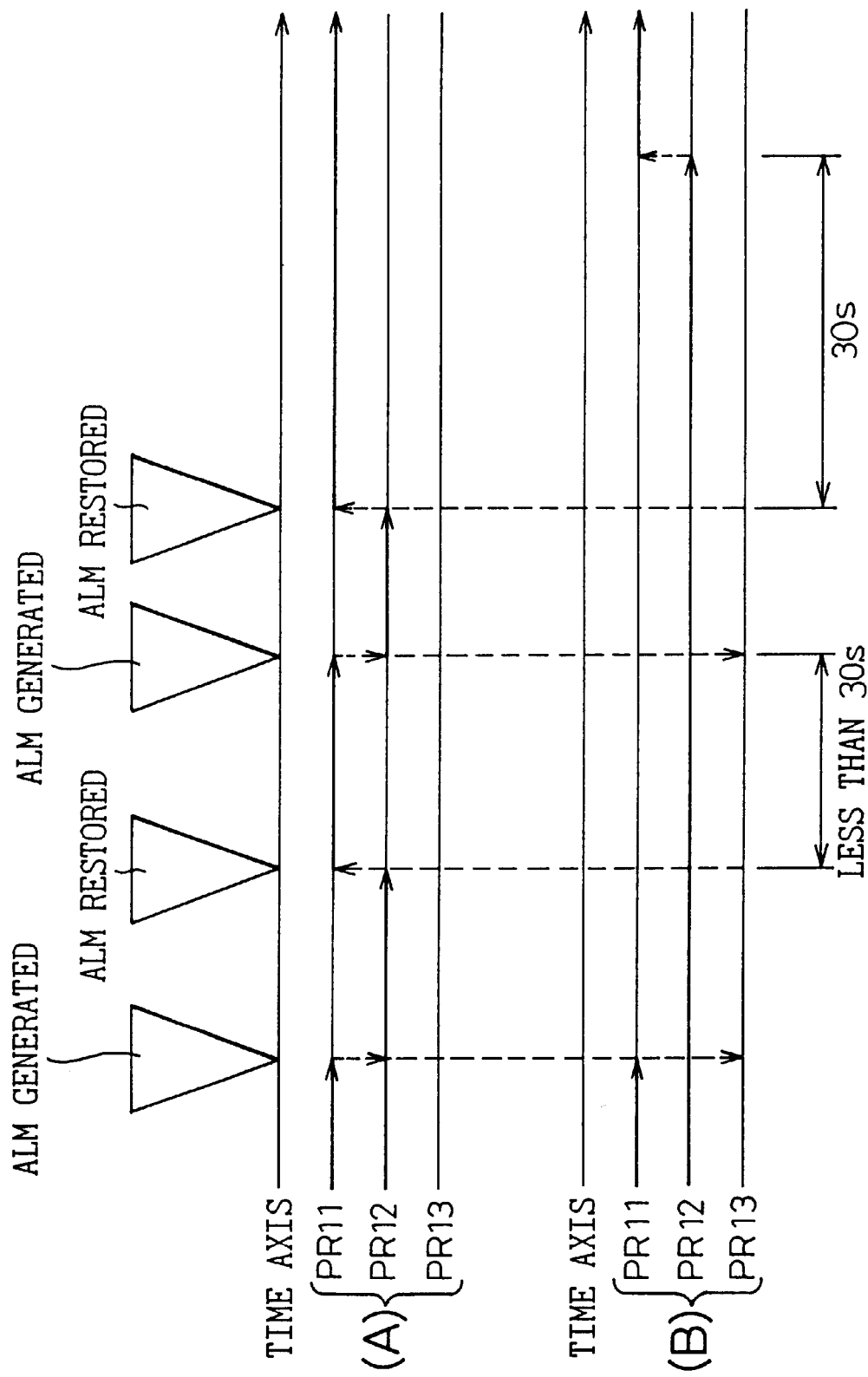
FIG. 15 is a diagram for explaining the clock switching timing depending on whether or not the protection time is valid.

FIG. 15 is a time chart for explaining the clock switching protection timing. In the clock switching protection process described above with reference to FIG. 14, (A) in FIG. 15 indicates that the switching protection time ERRFREE is set as invalid, and (B) in FIG. 15 indicates that the ERRFREE is set as valid. Characters PRI1 to PRI3 designate the order of priority 1 to 3. In the case where line 1, line 2 (the transmission/receiving units 1, 2 in FIG. 1) and an external clock source 3 are set as PRI1 to PRI3 in that order in a clock list, for example, it is assumed that they are so set in the descending order of quality level QL. Normally, therefore, the clock signal of PRI1 which has been set as highest in quality level QL is selectively switched and output.

In (A) of FIG. 15 where ERRFREE is invalid, it is assumed that the clock signal of PRI1 is selected and an alarm ALM is generated so that the clock signal cannot be extracted. Taking the hardware characteristics into consideration, the clock signal is switched to PRI2 set as the next quality level QL after the lapse of, say, 500 ms. Specifically, the quality determination processing unit 6, upon detection of the alarm ALM, controls the clock switching unit 5 in such a manner that the clock signal is switched to the next choice PRI2 registered in the clock list with reference to the clock list not shown, the synchronization management table 7 and the quality control table 8.

Once the alarm ALM is restored and it becomes possible to extract the clock signal, the quality determination processing unit 6 controls the clock switching unit 5 thereby to switch the clock signal to PRI1. In similar fashion, upon generation of the next alarm ALM, the clock signal of PRI1 is switched to the clock signal of PRI2, when this alarm ALM is restored, the clock signal is switched to PRI1 again. In the case where the alarm ALM is issued for the clock signal of PRI2 at the time of selective switching and output of the clock signal of PRI2, the clock signal is switched to PRI3 which is the next choice in order as the clock signals of PRI1 and PRI2 are in the alarm ALM state.

In (B) of FIG. 15B, as described above, the switching protection time ERRFREE is set as valid. In the case where the alarm ALM is generated and it becomes impossible to extract the clock signal during the selection of the clock signal of PRI1, therefore, as in the preceding case, the clock signal is switched to PRI2 of the next quality level QL after the lapse of, say, 500 ms. Once the alarm ALM is restored and it becomes possible to extract the clock signal, the quality determination processing unit 6 identifies that the switching protection time ERRFREE of the synchronization management table 7 is set as valid, and monitors the presence or absence of the issue of a new alarm ALM during the period of, say, 30 seconds of the switching protection time. The diagram shows the case in which a new alarm ALM is generated in less than 30 seconds, and therefore the selection of the clock signal of PRI2 is continued.

Upon restoration after generation of this new alarm ALM, as in the preceding case, whether a new alarm ALM is generated or not within 30 seconds as the switching protection time is monitored, and if a new alarm ALM is not generated after the lapse of 30 seconds of the switching protection time, the quality determination processing unit 6 controls the clock switching unit 5 to switch the clock signal to PRI1 again. As a result, a wasteful switching control of the clock signal can be avoided in the unstable transmission path where the generation and the restoration of the alarm ALM are repeated.

The present invention is not limited to the embodiments described above, but is applicable to various modifications and additions thereof. At the time of switching the clock signal or sending out the AIS, for example, a configuration can be added for notifying the operator. Also, the threshold of the quality level set in the synchronization management table 7 can be selected arbitrarily taking the system characteristics, etc. into account.

It will thus be understood from the foregoing description that according to this invention, a master clock signal can be selected and output based on quality information transferred together with a plurality of clock signals. At the same time, in the case where the quality level derived from the quality information of the master clock signal is deteriorated beyond a threshold for quality deterioration determination, the operator can be warned by issuing an alarm to him. In the case where all the quality levels due to the quality information transferred with a plurality of clock signals are deteriorated beyond a threshold, the communication can be conducted using the clock signal in a hold-over state or the clock signal generated from the clock generator in the local system. The communication can be continued, therefore, even when the clock signal from an external source is deteriorated in quality.

Also, by identifying the type of the unit configuring a transmission apparatus and controlling by switching the type of the clock signal in accordance with the type of the unit, the quality deterioration of the clock signal or the fault of the unit can be coped with easily while at the same time reducing the burden on the operator by switching and controlling the clock signal type corresponding to the unit type. Further, by setting the switching protection, the unstable state which otherwise might be caused by the switching control of the clock signal of the clock switching unit 5 upon generation or restoration of an alarm can be avoided.

In the case where a virtual SSM is selected, on the other hand, the quality information of the clock signal received and extracted from the line on the other side, i.e. on the external clock correction unit side is compared with the quality information of the clock signal sent out to the line on the same other side thereby to determine a closed loop state. In this way, the quality of the clock signal in the synchronous network system can be maintained.

What is claimed is:

1. A clock management method for a synchronous network system including a plurality of transmission apparatuses, each of said transmission apparatuses selecting a master clock signal from a plurality of clock signals and carrying out the communication with the other of said transmission apparatuses using a clock signal generated based on said master clock signal or using a clock signal generated in the transmission apparatus, comprising the steps of:

selectively switching and outputting said master clock signal by a clock switching unit based on quality information transferred together with a plurality of said clock signals;

setting a variable threshold for quality level deterioration determination based on said quality information; and issuing an alarm when the quality level of the clock signal selectively switched and output by said clock switching unit is deteriorated to such an extent as to exceed said threshold;

wherein said plurality of transmission apparatuses includes a plurality of types of units; and said method further comprises the step of identifying the type of a unit and selectively outputting a clock signal of a type corresponding to the type of said unit.

2. A clock management method for a synchronous network system including a plurality of transmission apparatuses, each of said transmission apparatuses selecting a master clock signal from a plurality of clock signals and carrying out the communication with the other of said transmission apparatuses using a clock signal generated based on said master clock signal or using a clock signal generated in the transmission apparatus, comprising the steps of:

selectively switching and outputting said master clock signal by a clock switching unit based on quality information transferred together with a plurality of said clock signals;

setting a variable threshold for quality level deterioration determination based on said quality information; and issuing an alarm when the quality level of the clock signal selectively switched and output by said clock switching unit is deteriorated to such an extent as to exceed said threshold;

further comprising a step of changing and sending out the quality information of a clock signal received and extracted in one of said plurality of transmission apparatuses that includes the substep of sending out a clock signal to the line on one side of said transmission apparatus together with a "do not use" message in the case where the quality information of the clock signal received and extracted from said line on one side of said transmission apparatus is identical to the quality information of the clock signal received and extracted from the line on the other side of said transmission apparatus and in the case where the quality information of the clock signal sent out to the line on said other side of said transmission apparatus is identical to the quality information of the clock signal received and extracted from the line on said one side of said transmission apparatus.

3. A clock management method for a synchronous network system including a plurality of transmission apparatuses, each of said transmission apparatuses selecting a master clock signal from a plurality of clock signals and carrying out the communication with the other of said transmission apparatuses using a clock signal generated based on said master clock signal or using a clock signal generated in the transmission apparatus, comprising the steps of:

selectively switching and outputting said master clock signal by a clock switching unit based on quality information transferred together with a plurality of said clock signals;

setting a variable threshold for quality level deterioration determination based on said quality information;

issuing an alarm when the quality level of the clock signal selectively switched and output by said clock switching unit is deteriorated to such an extent as to exceed said threshold; and judging a switching protection as valid or invalid at the time of restoration after an alarm for the clock signal selectively switched and output by said clock switching unit, switching to the original clock signal immediately when the switching protection is set as invalid, and switching to the original clock signal only in the absence of a new alarm generated within the switching protection time when the switching protection is set as valid.

4. A transmission apparatus for a synchronous network system for selecting a master clock signal form a plurality of clock signals, and carrying out the communication by a selected one of the clock signals generated based on said master clock signal and the clock signal generated only in said transmission apparatus, said transmission apparatus comprising:

a clock switching unit for selecting one of a plurality of said clock signals based on the quality information transferred together with a plurality of said clock signals and applying said selected clock signal as a master clock signal to a clock generator;

a synchronization management table for setting a threshold of the quality level of the clock signal; and a quality determination processing unit for monitoring the quality level based on the quality information of the clock signal selectively switched and output by said clock switching unit and sending out an alarm in the case where the quality level is deteriorated beyond the threshold set in said synchronization management table;

wherein said synchronization management table includes an area for setting a switching protection time as valid or invalid upon restoration after an alarm is generated for the clock signal being selected.

5. A transmission apparatus for a synchronous network system for selecting a master clock signal form a plurality of clock signals, and carrying out the communication by a selected one of the clock signals generated based on said master clock signal and the clock signal generated only in said transmission apparatus, said transmission apparatus comprising:

a clock switching unit for selecting one of a plurality of said clock signals based on the quality information transferred together with a plurality of said clock signals and applying said selected clock signal as a master clock signal to a clock generator;

a synchronization management table for setting a threshold of the quality level of the clock signal; and a quality determination processing unit for monitoring the quality level based on the quality information of the clock signal selectively switched and output by said clock switching unit and sending out an alarm in the case where the quality level is deteriorated beyond the threshold set in said synchronization management table;

wherein said quality determination processing unit controls said clock switching unit in such a manner as to switch to the original clock only in the case where a new alarm is not generated within a switching protection time upon restoration of an alarm as the result of setting the switching protection a valid in said synchronization management table after generation of an alarm for the clock signal being selected.

6. A transmission apparatus for a synchronous network system for selecting a master clock signal form a plurality of clock signals, and carrying out the communication by a selected one of the clock signals generated based on said master clock signal and the clock signal generated only in said transmission apparatus, said transmission apparatus comprising:

a clock switching unit for selecting one of a plurality of said clock signals based on the quality information transferred together with a plurality of said clock signals and applying said selected clock signal as a master clock signal to a clock generator;

a synchronization management table for setting a threshold of the quality level of the clock signal;

a quality determination processing unit for monitoring the quality level based on the quality information of the clock signal selectively switched and output by said clock switching unit and sending out an alarm in the case where the quality level is deteriorated beyond the threshold set in said synchronization management table; and means for changing and sending out the quality information of a clock signal received and extracted from a line on one side of the transmission apparatus by comparing the quality information of the clock signal received and extracted from the line on the one side of said transmission apparatus with the quality information of the clock signal received and extracted from the line on another side thereof, comparing the quality information of the clock signal sent to said line on the other side of said transmission apparatus with said quality information of said clock signal received and extracted from said line on said other side of said transmission apparatus, and sending out said clock signal to said line on said one side of said transmission apparatus together with a "do not use" message in the case where said compared quality information are identical to each other in at least one of said two cases of comparison.

* * * * *